US012617353B2

(12) United States Patent
Boehm

(10) Patent No.: US 12,617,353 B2
(45) Date of Patent: May 5, 2026

(54) MESSAGE HOLDER

(71) Applicant: Textron Inc., Providence, RI (US)

(72) Inventor: Christopher Alexander Boehm, North Augusta, SC (US)

(73) Assignee: TEXTRON INC., Providence, RI (US)

( * ) Notice: Subject to any disclaimer, the term of this patent is extended or adjusted under 35 U.S.C. 154(b) by 82 days.

(21) Appl. No.: 18/649,481

(22) Filed: Apr. 29, 2024

(65) Prior Publication Data

US 2025/0333008 A1 Oct. 30, 2025

(51) Int. Cl.
B60R 13/10 (2006.01)

(52) U.S. Cl.
CPC .................................. B60R 13/105 (2013.01)

(58) Field of Classification Search
CPC ...... G09F 21/04; G09F 21/048; G09F 21/049; G09F 21/042; G09F 21/0485; B60R 11/00; B60R 7/00; B60P 3/0255
USPC ........ 296/37.8; 224/274; 248/218.4; 40/591, 40/593
See application file for complete search history.

(56) References Cited

U.S. PATENT DOCUMENTS

| | | | |
|---|---|---|---|
| 3,930,432 A | 1/1976 | Puchy | |
| 4,005,842 A | 2/1977 | Lane | |
| 4,169,308 A | 10/1979 | Minogue | |
| 4,467,543 A | 8/1984 | Townsend | |
| 4,611,379 A | 9/1986 | Heitzman | |
| 4,683,670 A | 8/1987 | Bates | |
| 4,821,987 A | 4/1989 | Haman | |
| 4,863,242 A | 9/1989 | Correa | |
| 4,930,183 A | 6/1990 | Owens | |
| 5,018,291 A | 5/1991 | Pasquale et al. | |
| 5,380,057 A | 1/1995 | Wevers | |
| 5,381,814 A | 1/1995 | Brandon | |
| 5,381,992 A | 1/1995 | Lohausen | |
| 5,396,915 A | 3/1995 | Bomar | |
| 5,445,428 A | 8/1995 | Yung-Sung | |
| 5,601,267 A | 2/1997 | Caine | |
| 5,899,167 A | 5/1999 | Furman | |
| 6,691,965 B1 | 2/2004 | Lin | |
| 6,739,371 B2 | 5/2004 | Mukai | |
| 7,097,082 B2 | 8/2006 | Wallaker | |
| 7,243,449 B2 | 7/2007 | Wichmann | |
| 7,694,927 B2 | 4/2010 | Chuang | |
| 8,087,623 B2 | 1/2012 | Suddarth | |

(Continued)

FOREIGN PATENT DOCUMENTS

| | | |
|---|---|---|
| AU | 2010101452 B4 | 6/2011 |
| CH | 395565 A | 7/1965 |

(Continued)

*Primary Examiner* — Cassandra Davis
(74) *Attorney, Agent, or Firm* — Foley & Lardner LLP

(57) ABSTRACT

A golf vehicle includes a chassis, a support bar mounted to the chassis, a display, a display mount, and a message holder. The display mount couples the display to the support bar. The display mount includes a bracket assembly coupled to the display and the support bar, and a housing at least partially covering the bracket assembly. The housing defines a first aperture. The message holder includes an at least partially transparent panel. The message holder defines (a) a slot configured to receive a message and (b) a second aperture that aligns with the first aperture of the housing to receive a fastener to couple the message holder to the housing.

20 Claims, 12 Drawing Sheets

(56) References Cited

U.S. PATENT DOCUMENTS

| | | | |
|---|---|---|---|
| 8,458,964 | B2 | 6/2013 | Lamotte |
| 8,523,129 | B2 | 9/2013 | Stifal et al. |
| 9,283,904 | B2 | 3/2016 | Parenti |
| 9,547,850 | B1 | 1/2017 | Singgih et al. |
| 9,551,154 | B1 | 1/2017 | Fouratt et al. |
| 9,951,903 | B2 | 4/2018 | Barnes |
| 10,184,504 | B1 | 1/2019 | Carroll |
| 10,350,971 | B1 | 7/2019 | Rich |
| 10,753,529 | B2 | 8/2020 | Hung |
| 10,791,854 | B2 | 10/2020 | Fang et al. |
| 11,511,604 | B2 | 11/2022 | Johananoff |
| 11,882,928 | B2 | 1/2024 | Pan |
| 12,180,985 | B2 * | 12/2024 | Pasternak ............... F16B 5/10 |
| 2003/0056817 | A1 | 3/2003 | Miller et al. |
| 2005/0086843 | A1 * | 4/2005 | Buchanan ............... G09F 7/10 40/607.14 |
| 2005/0258321 | A1 | 11/2005 | Worrall et al. |
| 2006/0125276 | A1 | 6/2006 | Chen |
| 2007/0057128 | A1 | 3/2007 | Michalski et al. |
| 2007/0277411 | A1 | 12/2007 | Logan et al. |
| 2008/0029137 | A1 | 2/2008 | Mcinville |
| 2008/0029669 | A1 | 2/2008 | Olah et al. |
| 2008/0292428 | A1 | 11/2008 | Coonjohn |
| 2009/0021655 | A1 | 1/2009 | Walters |
| 2009/0032665 | A1 | 2/2009 | Smith et al. |
| 2009/0109352 | A1 | 4/2009 | Lewis et al. |
| 2010/0192434 | A1 | 8/2010 | Smith et al. |
| 2011/0155868 | A1 | 6/2011 | Sun et al. |
| 2013/0108395 | A1 | 5/2013 | Bourget et al. |
| 2013/0112835 | A1 | 5/2013 | Buley et al. |
| 2013/0256478 | A1 | 10/2013 | Reda et al. |
| 2014/0190541 | A1 | 7/2014 | Lovley et al. |
| 2015/0075041 | A1 * | 3/2015 | Pasternak ............... A63B 69/36 40/124.06 |
| 2015/0291259 | A1 | 10/2015 | Perosino et al. |
| 2015/0336520 | A1 | 11/2015 | Parenti |
| 2016/0152122 | A1 | 6/2016 | Arichandran et al. |
| 2016/0214653 | A1 | 7/2016 | Cook |
| 2016/0355077 | A1 | 12/2016 | Hingne et al. |
| 2017/0114546 | A1 | 4/2017 | Rusnak et al. |
| 2018/0106417 | A1 | 4/2018 | Walters |
| 2019/0041905 | A1 | 2/2019 | Bacallao |
| 2019/0292808 | A1 | 9/2019 | Dotterweich |
| 2021/0140191 | A1 | 5/2021 | Cullen |
| 2021/0245587 | A1 | 8/2021 | Harms et al. |
| 2021/0332606 | A1 | 10/2021 | Cullen |
| 2023/0055167 | A1 | 2/2023 | Ortiz et al. |
| 2024/0131929 | A1 * | 4/2024 | Inoue ................. B60R 11/0235 |

FOREIGN PATENT DOCUMENTS

| | | |
|---|---|---|
| CN | 201111787 Y | 9/2008 |
| DE | 16 63 638 U | 9/1953 |
| DE | 17 48 191 U | 7/1957 |
| DE | 19 02 065 U | 10/1964 |
| DE | 66 03 802 U | 11/1969 |
| DE | 22 47 826 A1 | 4/1974 |
| DE | 80 22 261 U1 | 11/1980 |
| DE | 81 08 279 U1 | 6/1981 |
| EP | 0 272 8 A1 | 7/1979 |
| EP | 0 696 53 A1 | 1/1983 |
| EP | 0 130 234 B1 | 1/1985 |
| EP | 0 277 290 A1 | 8/1988 |
| EP | 0 278 067 A1 | 8/1988 |
| EP | 0 439 304 A1 | 7/1991 |
| EP | 0 573 422 A1 | 12/1993 |
| EP | 0 851 129 A1 | 7/1998 |
| EP | 1 051 936 A2 | 11/2000 |
| EP | 1 413 678 B1 | 4/2004 |
| EP | 2 032 395 A1 | 3/2009 |
| EP | 4 077 955 A1 | 10/2022 |
| FR | 2459523 A1 | 7/1978 |
| GB | 2 203 882 A | 10/1988 |
| GB | 2 252 141 A | 5/1991 |
| GB | 2 221 156 A | 12/1991 |
| GB | 2 512 162 A | 5/2015 |
| IT | RM960234 U1 | 4/1998 |
| JP | S5810737 Y2 | 1/1983 |
| KR | 200243379 Y1 | 5/2001 |
| KR | 20110003620 U | 4/2011 |
| RU | SU1286151 A1 | 1/1987 |
| RU | 78356 U1 | 11/2008 |
| WO | WO-94/02745 A1 | 2/1994 |
| WO | WO-03/090004 A1 | 10/2003 |

* cited by examiner

MESSAGE HOLDER

BACKGROUND

Golf vehicles often include message holders within which a message can be inserted, such as a cart number or a driver identifier. However, the canopies and support bars of golf vehicles now typically include internal water flow channels such that messages holders cannot be directly connected thereto. Accordingly, attaching message holder to such golf vehicles presents a challenge.

SUMMARY

One embodiment relates to a golf vehicle. The golf vehicle includes a chassis, a support bar mounted to the chassis, a display, a display mount, and a message holder. The display mount couples the display to the support bar. The display mount includes a bracket assembly coupled to the display and the support bar, and a housing at least partially covering the bracket assembly. The housing defines a first aperture. The message holder includes an at least partially transparent panel. The message holder defines (a) a slot configured to receive a message and (b) a second aperture that aligns with the first aperture of the housing to receive a fastener to couple the message holder to the housing.

Another embodiment relates to a display mount for mounting a display to a golf vehicle. The display mount includes a bracket assembly, a housing, and a message holder. The bracket assembly is configured to couple the display to a support bar of the golf vehicle. The housing is configured to at least partially cover the bracket assembly. The housing defines a first aperture. The message holder includes an at least partially transparent panel. The message holder defines (a) a slot configured to receive a message and (b) a second aperture that aligns with the first aperture of the housing to receive a fastener to couple the message holder to the housing.

Still another embodiment relates to a mount for mounting a device to a golf vehicle. The mount includes a bracket assembly, a housing, and a message holder. The bracket assembly is configured to couple the device to a support bar of the golf vehicle. The bracket assembly includes a post extending therefrom. The housing is configured to at least partially cover the bracket assembly. The housing defines a first aperture. The message holder includes a first panel and a second panel coupled to the first panel with a slot defined therebetween that is configured to receive a message. A top portion of one of the first panel or the second panel defines a second aperture that aligns with the first aperture of the housing and the post of the bracket assembly. The first aperture, the second aperture, and the post are configured to receive a fastener to couple the message holder and the housing to the bracket assembly. The housing includes a retainer positioned to prevent rotation of the message holder relative to the housing.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 3 is a second configuration, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
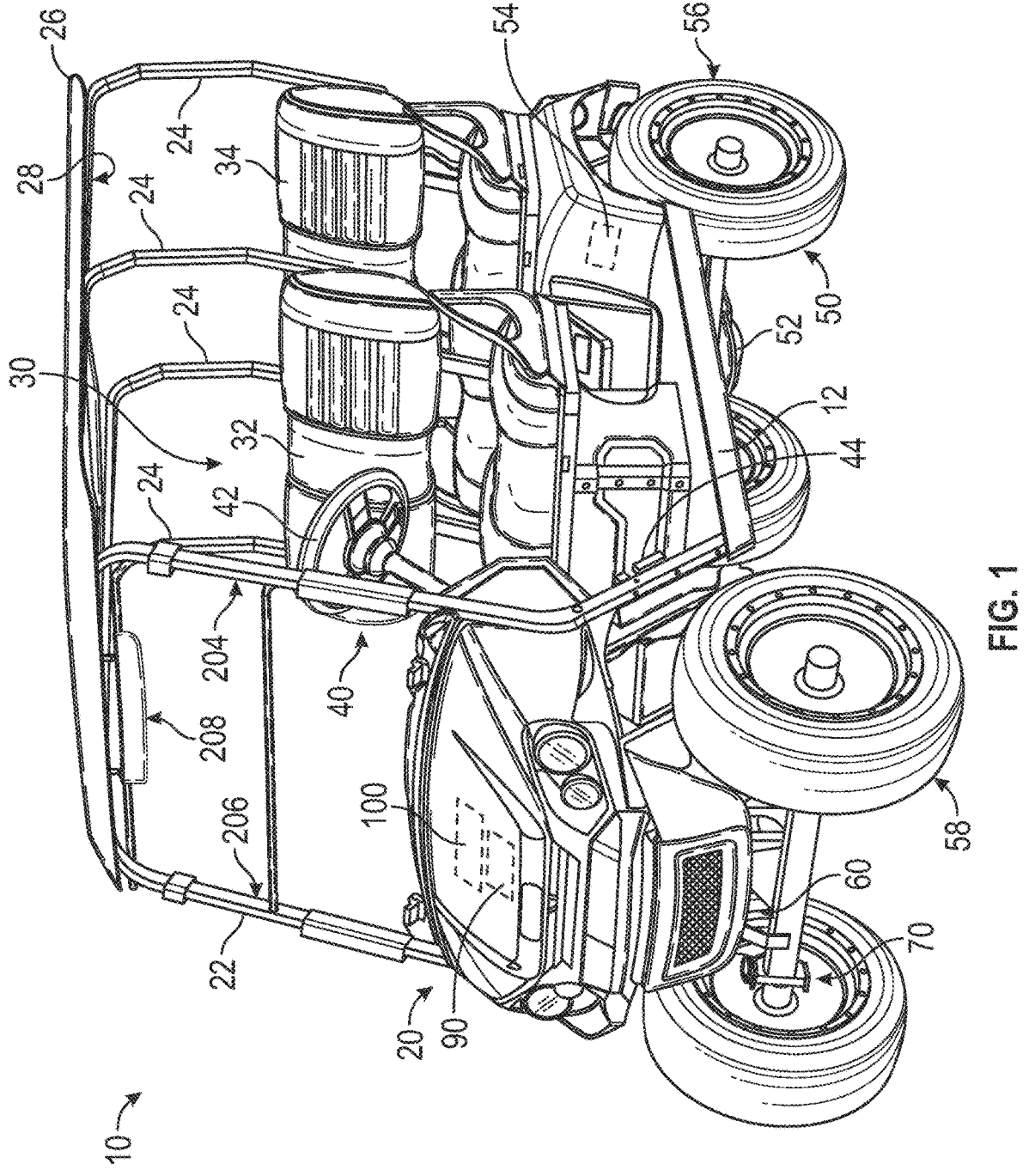
FIG. 1 is a perspective view of a vehicle, according to an exemplary embodiment.
Figure 2:
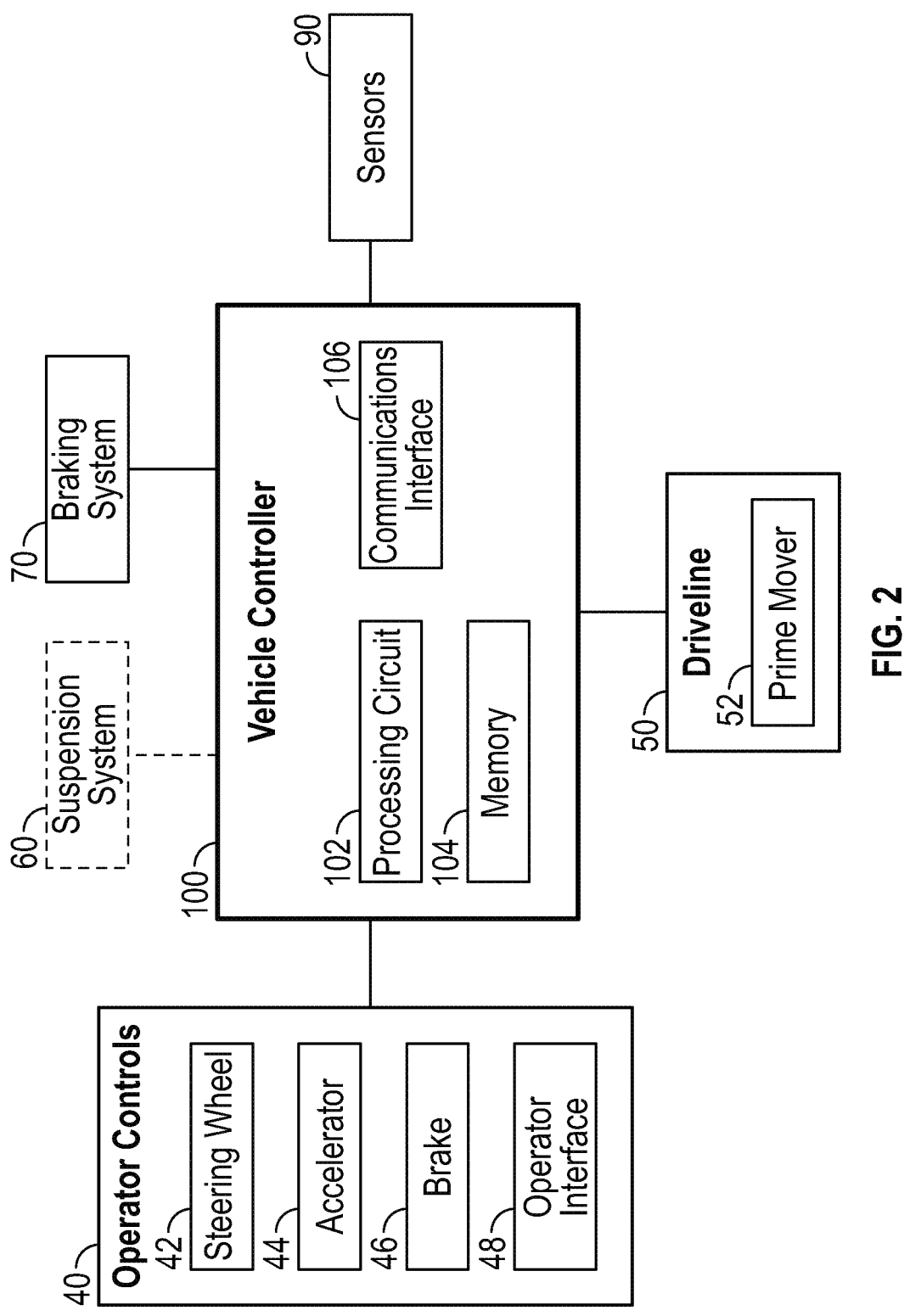
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a vehicle control system, shown as vehicle controller 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

As shown in FIG. 1, the vehicle 10 includes a plurality of support bars including one or more front supports, shown as front support bar 22, and one or more rear or middle supports, shown as rear support bars 24. The front support bar 22 and the rear support bars 24 are coupled to the body 20 and/or the frame 12 of the vehicle 10. The front support bar 22 and the rear support bar 24 are coupled to and support a roof, shown as canopy 26, that is positioned above the front row seating 32 and the rear row seating 34. In some embodiments, the canopy 26 includes one or more frame bars, shown as canopy frame 28, that are coupled to the front support bar 22 and/or the rear support bars 24. In some embodiments, the canopy frame 28 is integrally formed with the front support bar 22 and/or the rear support bars 24. In some embodiments, the front support bar 22 and the rear support bars 24 are coupled to the canopy frame 28 using one or more fasteners (e.g., bolts, screws, rivets, or other fastening agents). In some embodiments, the front support bar 22 and the rear support bars 24 are coupled directly to the canopy 26.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle controller 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle controller 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle controller 100 may represent a collection of processing devices. In such cases, the processing circuit 102 represents the collective processors of the devices, and the memory 104 represents the collective storage devices of the devices.

In one embodiment, the vehicle controller 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle controller 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle controller 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Multi-Height Device Mount

Referring generally to FIGS. 3-10, the vehicle 10 may include different canopies and one or more support bars that allow a device to be mounted to the vehicle 10. The different canopies may be configured to provide different amounts of headroom for a user sitting in the vehicle 10. A multi-height device mount couples the device to the vehicle 10 and allows the height of the device to be adjusted. The height of the device can be adjusted based on the arrangement of the one or more support bars and/or the canopy of the vehicle 10. The multi-height device mount allows for the device to be coupled to the vehicle 10 in one of multiple height positions or configurations. In some embodiments, the multiple height positions include a lower mounting position or configuration and an upper mounting position or configuration. In some embodiments, the multiple height positions include one or more middle mounting positions or configurations between the upper mounting position and above the lower mounting position.

Figure 3:
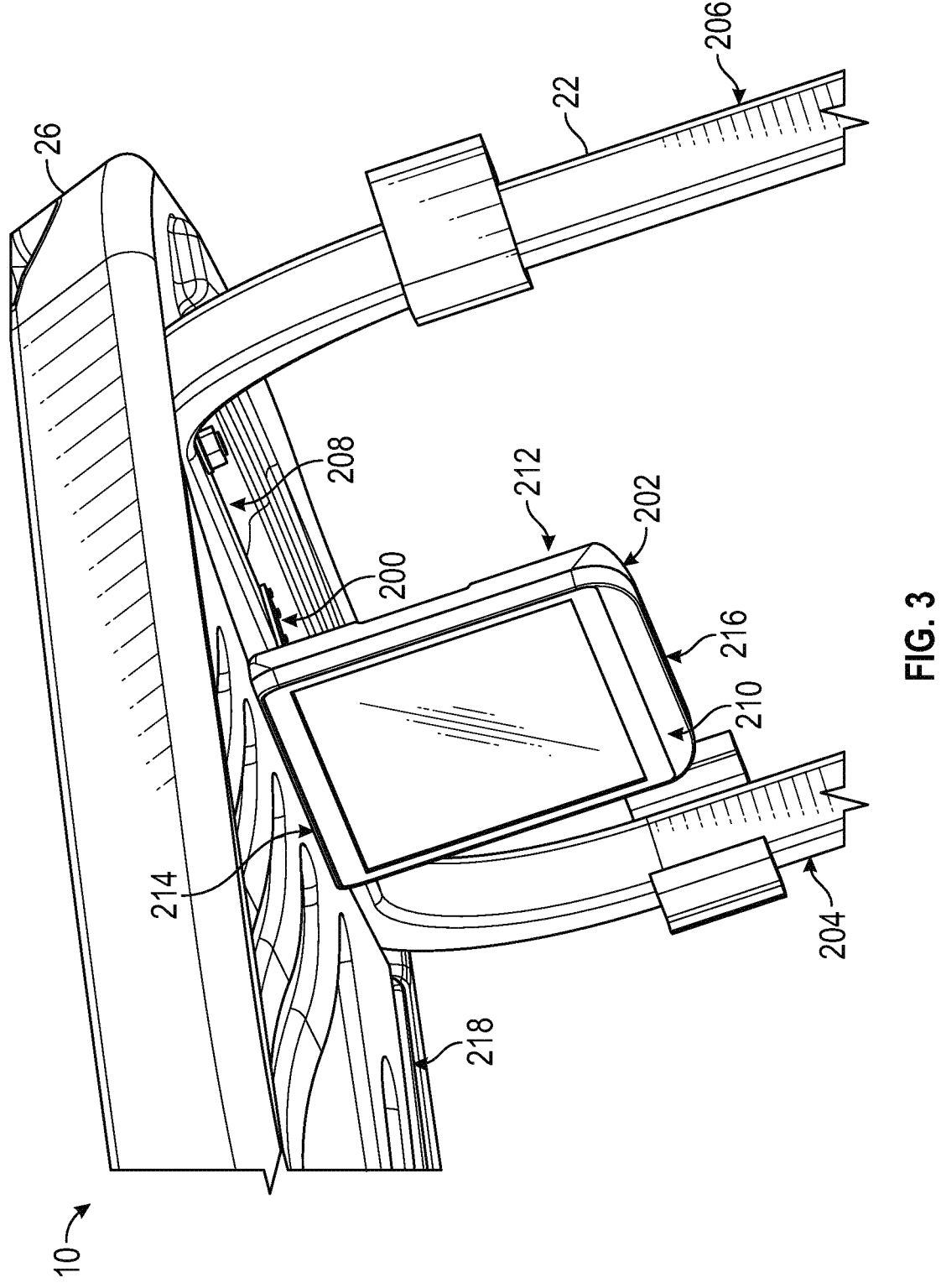
FIG. 3 is a perspective view of a multi-height device mount of the vehicle of FIG. 1 in a first configuration, according to an exemplary embodiment.
Figure 4:
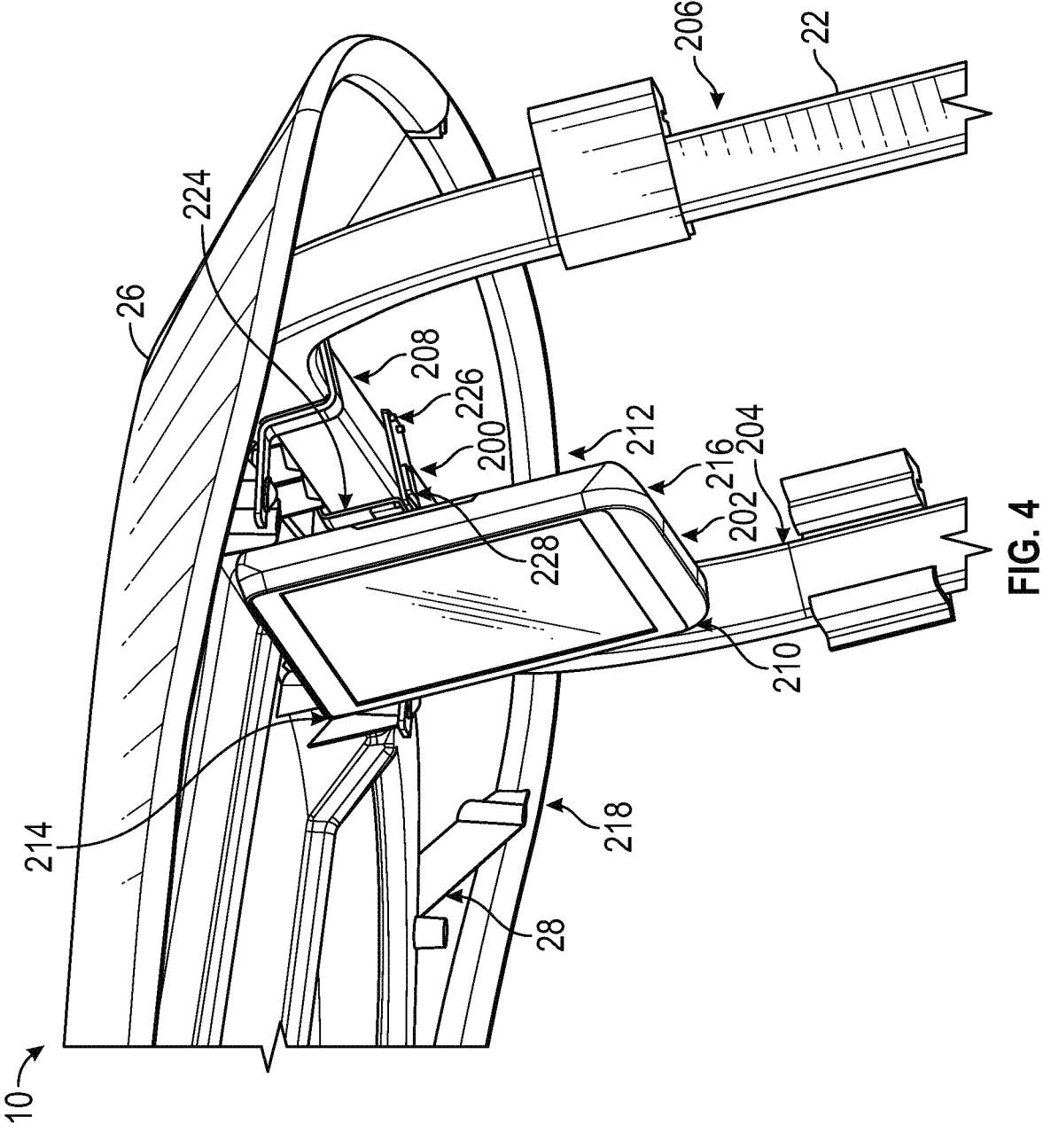
FIG. 4 is a perspective view of the multi-height device mount
Figure 5:
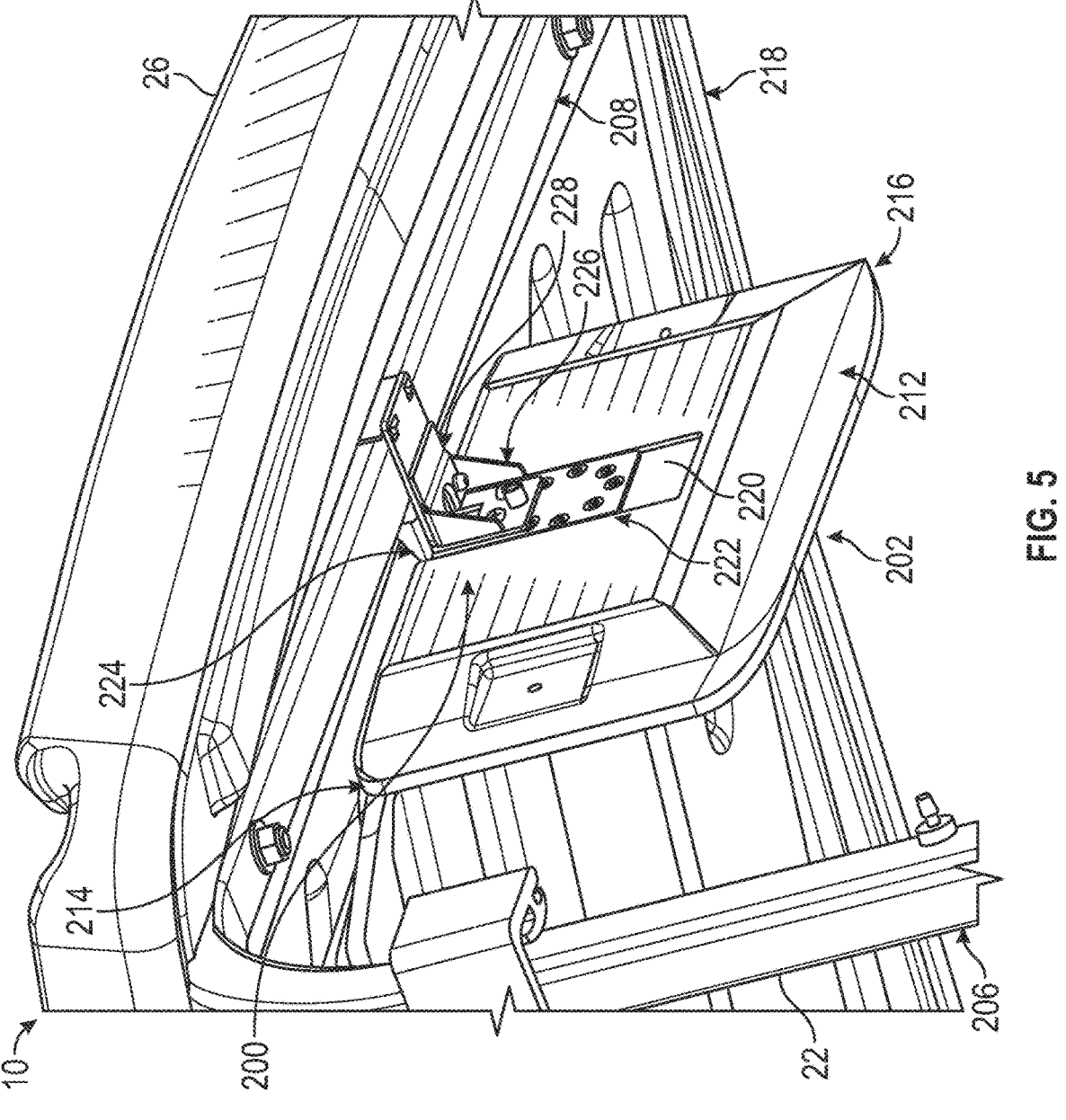
FIG. 5 is another perspective view of the multi-height device mount of FIG. 3 in the first configuration, according to an exemplary embodiment.

As shown in FIGS. 3-5, a bracket assembly, shown as multi-height device mount 200, couples a device (e.g., screen, tablet, display, etc.), shown as display 202, to the front support bar 22 of the vehicle 10. The display 202 includes a first side, shown as front side 210, an opposing second side, shown as rear side 212, a first end, shown as top 214, and a second, opposing end, shown as bottom 216. The display 202 is mounted to the front support bar 22 such that the front side 210 is oriented or facing toward the front row seating 32 and the rear row seating 34. As shown in FIGS. 1 and 3-5, the front support bar 22 includes a first portion, shown as left portion 204, positioned proximate and extending vertically along a left or driver's side of the vehicle 10; a second portion, shown as right portion 206, positioned proximate and extending vertically along a right or passenger's side of the vehicle 10; and a third portion, shown as middle portion 208, extending between upper ends of the left portion 204 and the right portion 206. According to the exemplary embodiment shown in FIGS. 3-5, the display 202 is mounted to the middle portion 208 of the front support bar 22 using the multi-height device mount 200. In other embodiments, the display 202 is mounted to the middle portion 208 of one of the rear support bars 24.

As shown in FIGS. 3-5, the canopy 26 includes a bottom side, shown as interior side 218. In some embodiments, as shown in FIG. 4, a first variant of canopy 26 includes the canopy frame 28 positioned along the interior side 218 thereof and the front support bar 22 and the rear support bars 24 are coupled to the canopy frame 28 (and not directly to the interior side 218 of the canopy 26). In some embodiments, as shown in FIGS. 3 and 5, the front support bar 22 and the rear support bars 24 are coupled directly to the interior side 218 of a second variant of the canopy 26. According to an exemplary embodiment, the multi-height device mount 200 is coupled along the middle portion 208 of the front support bar 22 and allows for the display 202 to be raised and lowered based on the available space between the interior side 218 of the canopy 26 and the top 214 of the display 202 for the two variants. Accordingly, the multi-height device mount 200 is configured to facilitate mounting the display 202 to the vehicle 10 with different variants of the canopy 26 that provide differing amounts of headroom or space between the interior side 218 of the canopy 26 and the middle portion 208 of the front support bar 22.

As shown in FIGS. 3 and 5, the display 202 is mounted to the multi-height device mount 200 in a first or upper mounting position. The upper mounting position allows for the display 202 to engage with the multi-height device mount 200 and extend further downward relative to the front support bar 22 providing a lower viewing position of the display 202 such that the top 214 of the display 202 does not extend above the front support bar 22 and does not engage with the interior side 218 of the canopy 26.

Figure 6:
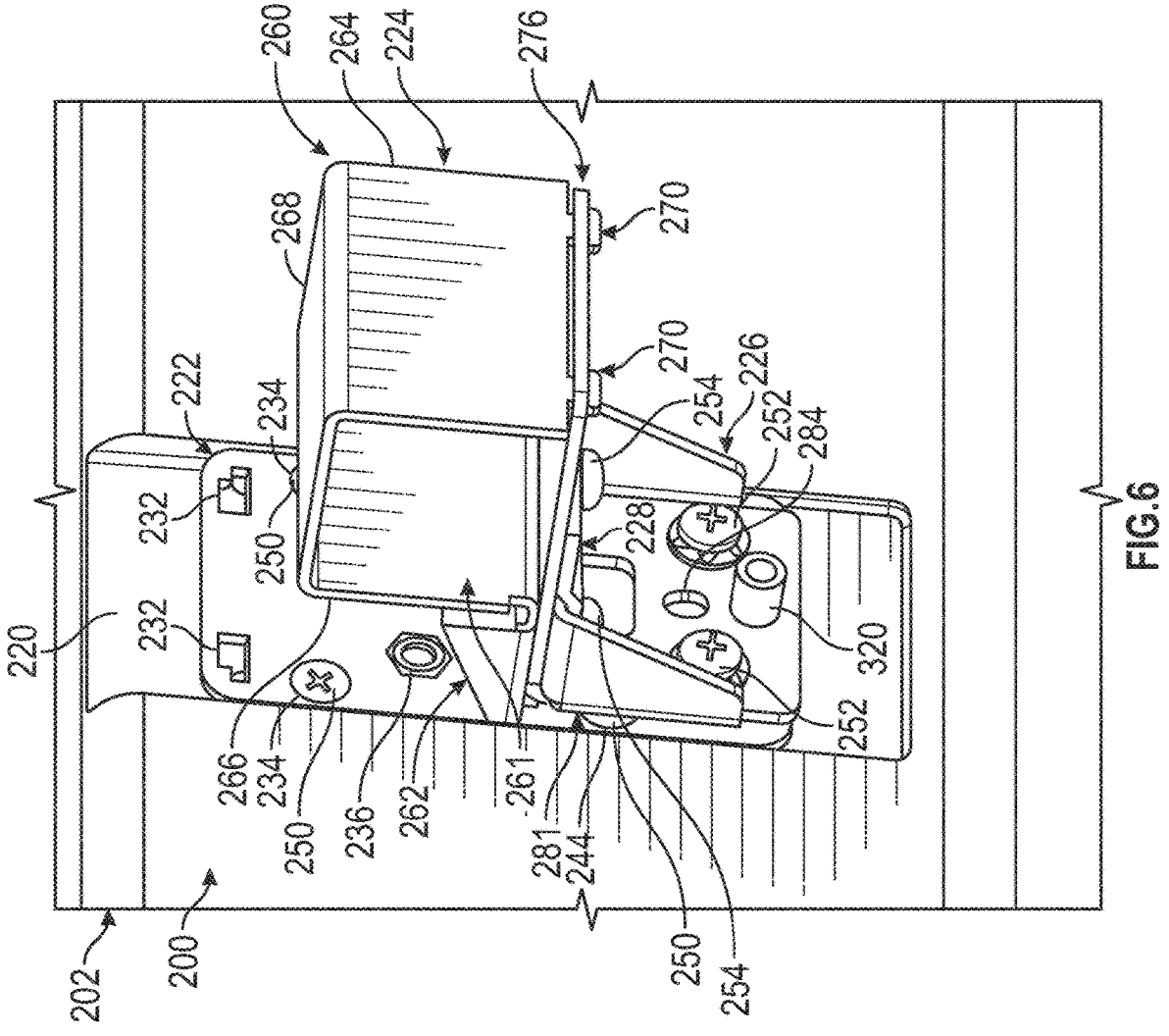
FIG. 6 is a detailed perspective view of the multi-height device mount of FIG. 3 in the second configuration, according to an exemplary embodiment.

As shown in FIGS. 4 and 6, the display 202 is mounted to the multi-height device mount 200 in a second or lower mounting position. The lower mounting position allows for the display 202 to engage with the multi-height device mount 200 and extend further upward relative to the front support bar 22 providing a higher viewing position of the display 202 such that the top 214 of the display 202 extends above the front support bar 22 and does not engage with the interior side 218 of the canopy 26.

As shown in FIGS. 5 and 6, the rear side 212 of the display 202 defines or includes an interface (e.g., a recessed interface), shown as mounting interface 220, that engages the multi-height device mount 200. The mounting interface 220 is positioned along a central plane (e.g., a plane extending through the top 214 and the bottom 216) of the display 202 and sized to receive a portion or component of the multi-height device mount 200. In some embodiments, the mounting interface 220 is integrally formed with or defined by the rear side 212 of the display 202. In some embodiments, the mounting interface 220 is an adapter coupled to the rear side 212 of the display 202.

Figure 7:
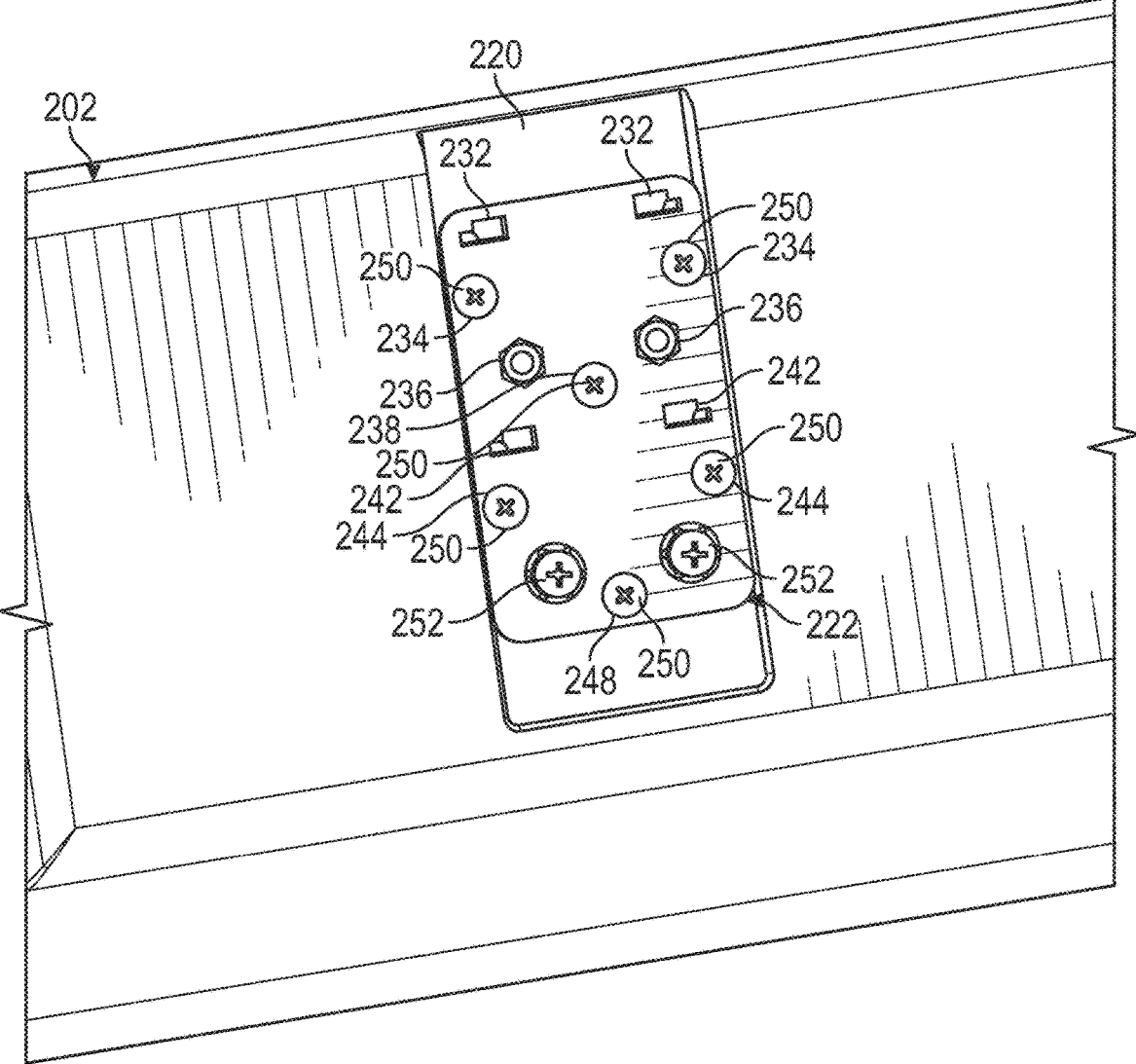
FIG. 7 is a detailed perspective view of a portion of the multi-height device mount of FIG. 3, according to an exemplary embodiment.
Figure 8:
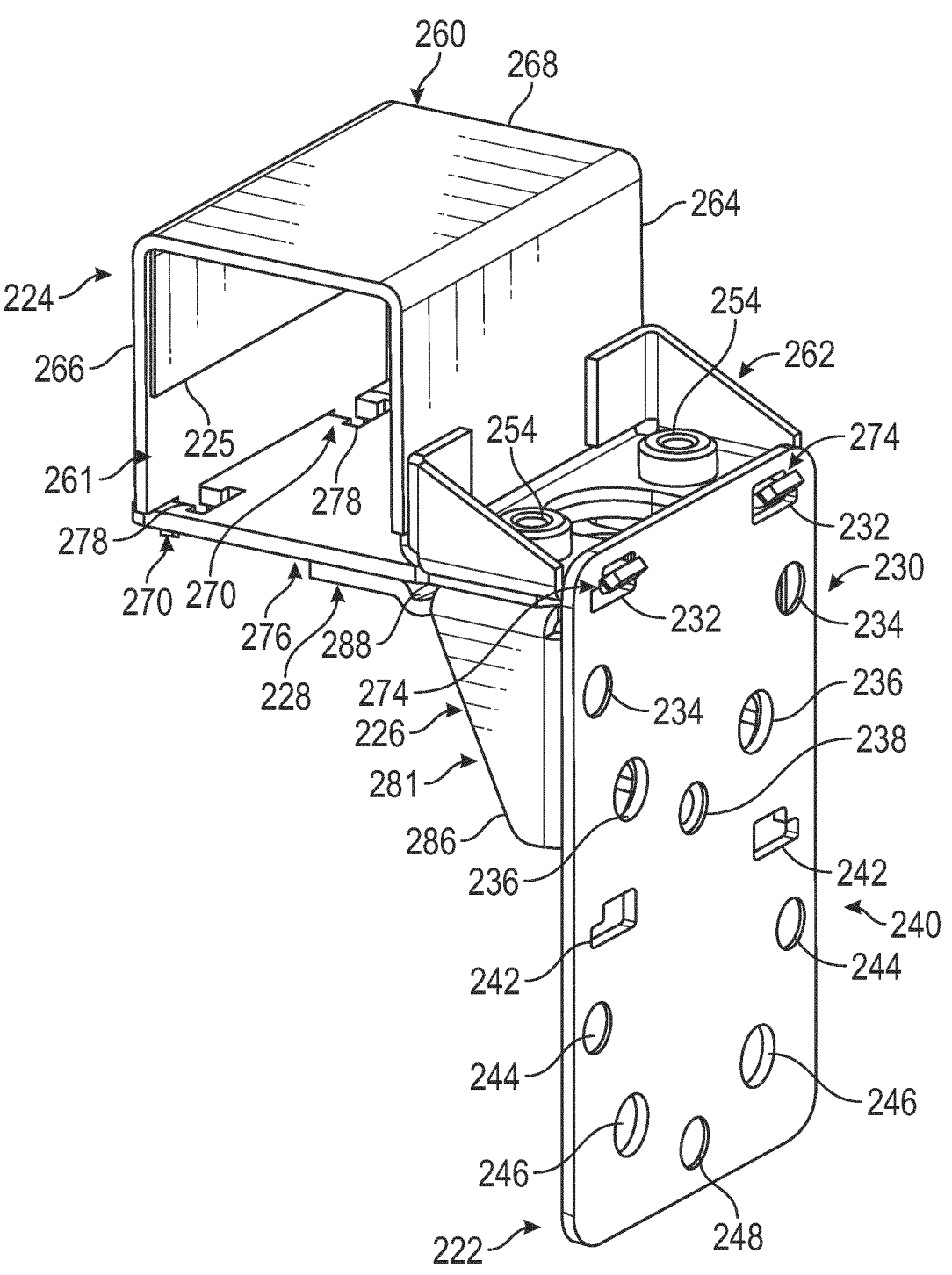
FIG. 8 is a detailed perspective view of the multi-height device mount of FIG. 3 in the first configuration, according to an exemplary embodiment.
Figure 9:
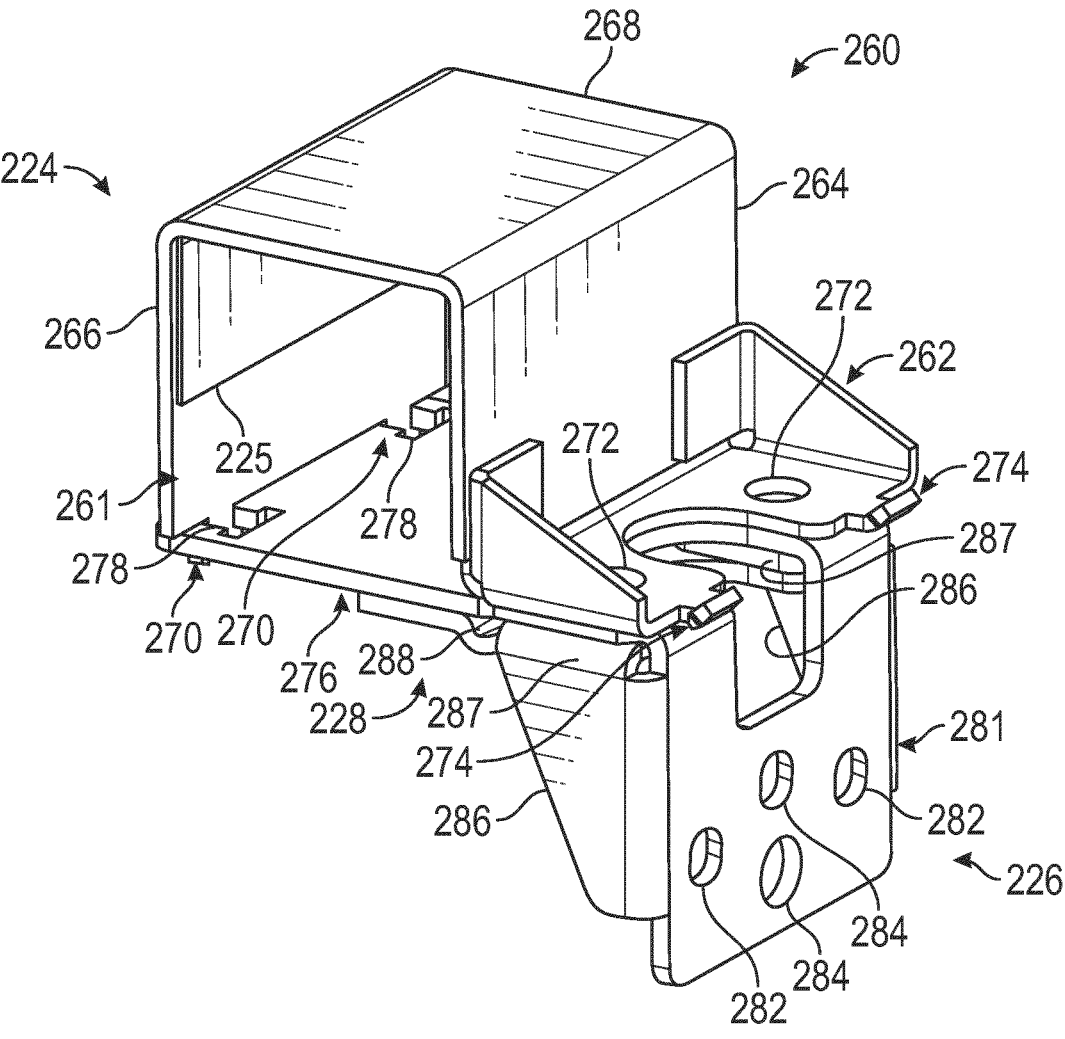
FIG. 9 is a detailed perspective view of a portion of the multi-height device mount of FIG. 3, according to an exemplary embodiment.

As shown in FIGS. 4-10, the multi-height device mount 200 includes a first component or plate, shown as device mounting plate 222, a second component or first bracket, shown as upper bracket 224, a third component or insert, shown as spacer 225, a fourth component or second bracket, shown as middle bracket 226, and a fifth component or third bracket, shown as lower bracket 228. The device mounting plate 222, the upper bracket 224, and the middle bracket 226 facilitate adjusting the height of the display 202 when coupled to the front support bar 22. As shown in FIGS. 5-7, the device mounting plate 222 engages the mounting interface 220 of the display 202. As shown in FIGS. 5, 6, and 8, the upper bracket 224 and the middle bracket 226 engage with the device mounting plate 222. As shown in FIGS. 6, 8, and 9, the upper bracket 224 is coupled to the middle bracket 226, and the lower bracket 228 is coupled to the middle bracket 226.

As shown in FIGS. 6-8, the device mounting plate 222 defines a plurality of mounting portions including a first mounting portion, shown as upper mounting portion 230, and a second mounting portion, shown as lower mounting portion 240. The upper mounting portion 230 is positioned above the lower mounting portion 240. The plurality of mounting portions facilitate coupling the display 202 to the multi-height device mount 200 in the upper mounting position or the lower mounting position. The upper mounting portion 230 includes one or more first upper bracket interfaces, shown as first upper bracket apertures 232, one or more first device interfaces, shown as first device apertures 234, one or more first middle bracket interfaces, shown as first middle bracket apertures 236, and at least one second device interface, shown as second device aperture 238. As shown in FIGS. 7 and 8, the lower mounting portion 240 includes one or more second upper bracket interfaces, shown as second upper bracket apertures 242, one or more third device interfaces, shown as third device apertures 244, one or more second middle bracket interfaces, shown as second middle bracket apertures 246, and at least one fourth device interface, shown as fourth device aperture 248.

As shown in FIGS. 6 and 7, the first device apertures 234, the second device aperture 238, the third device apertures 244, and the fourth device aperture 248 receive a first plurality of fasteners (e.g., screws, bolts, rivets, or another fastening agent), shown as device fasteners 250, that extend through the first device apertures 234, the second device aperture 238, the third device apertures 244, and the fourth device aperture 248 into the mounting interface 220 to couple the device mounting plate 222 to the mounting interface 220 of the display 202.

Figure 10:
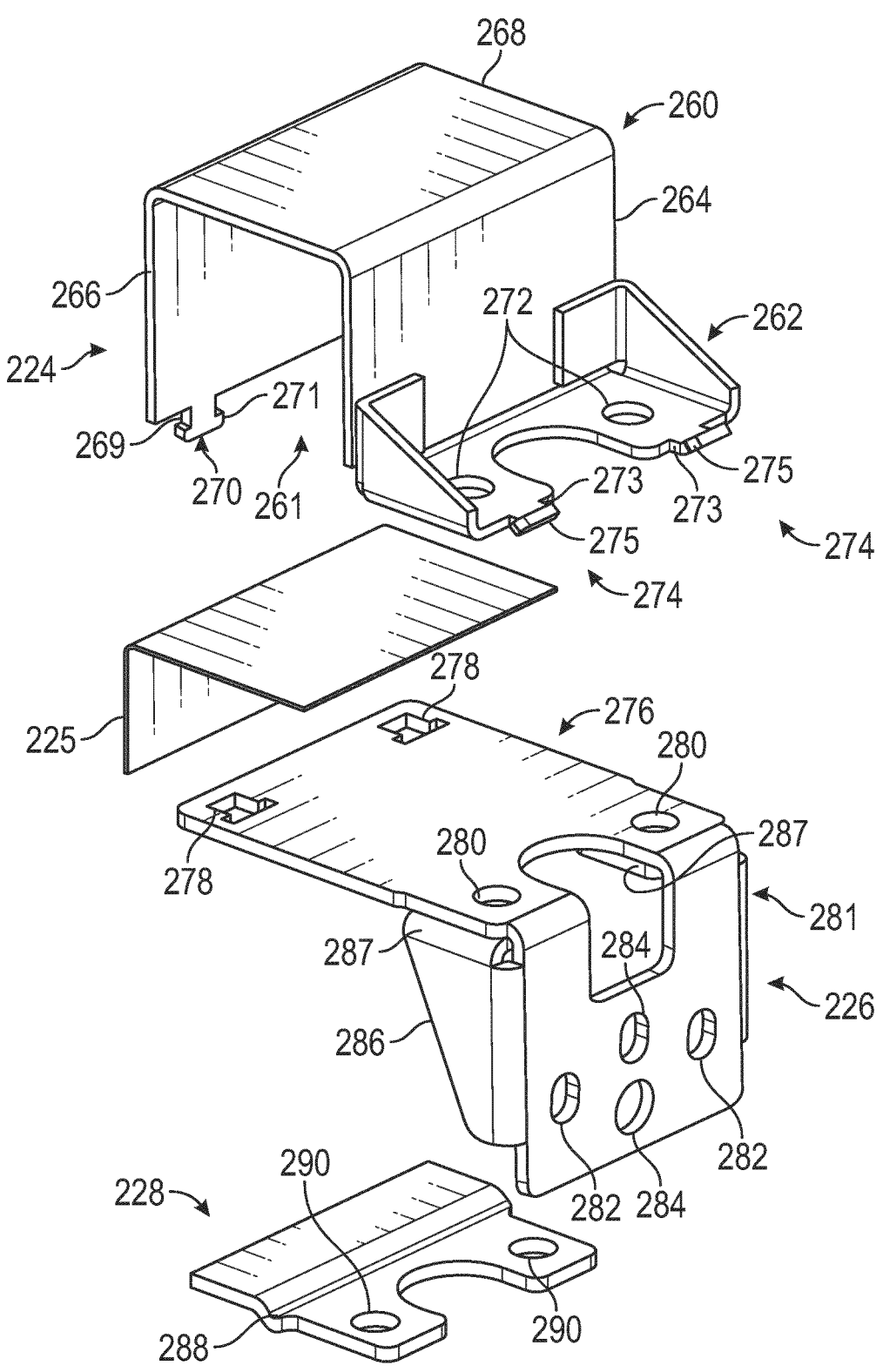
FIG. 10 is an exploded view of the portion of the multi-height device mount of FIG. 9, according to an exemplary embodiment.

As shown in FIGS. 6 and 8-10, the upper bracket 224 includes a first portion, shown as support bar interface 260, and a second portion, shown as mounting plate and lower bracket interface 262, coupled to the support bar interface 260. In some embodiments, the support bar interface 260 and the mounting plate and lower bracket interface 262 are integrally formed or coupled. In some embodiments, the support bar interface 260 and the mounting plate and lower bracket interface 262 are coupled together by one or more fasteners (e.g., screws, bolts, rivets, etc.). As shown in FIGS. 6 and 8-10, the support bar interface 260 has a first wall, shown as rear wall 264, an opposing second wall, shown as front wall 266, and a third wall, shown as middle wall 268, coupling upper ends of the front wall 266 to the rear wall 264 such that the support bar interface 260 has a "U-shaped" cross-section. The front wall 266 includes one or more first protrusions, retainers, or tabs, shown as first prongs 270, that extend downward from a bottom edge thereof. As shown in FIG. 10, the first prongs 270 include a first portion, shown as narrow portion 269, extending from the bottom edge of the front wall 266 and a second portion, shown as retainer portion 271, extending from the narrow portion 269 and that is wider than the narrow portion 269. The rear wall 264, the middle wall 268, and the front wall 266 cooperatively form or define a slot, pocket, or passage, shown as support bar channel 261, that receives the middle portion 208 of the front support bar 22.

As shown in FIGS. 8 and 9, the spacer 225 is configured to be positioned within the support bar channel 261 to engage with and be positioned between (a) the front wall 266 and the middle wall 268 (and, in some embodiments, the rear wall 264) of the support bar interface 260 and (b) the middle portion 208 of the front support bar 22 when the multi-height device mount 200 is coupled to the front support bar 22. In some embodiments, the spacer 225 is configured to prevent lateral movement of the multi-height device mount 200 along the middle portion 208 of the front support bar 22 (e.g., the spacer 225 may include a resilient material that provides a secure fit between the two components, the spacer 225 may provide an interference fit to maintain a position of the multi-height device mount 200, etc.).

As shown in FIGS. 6 and 8-10, the mounting plate and lower bracket interface 262 protrudes outward from an exterior surface of the rear wall 264 of the support bar interface 260. According to the exemplary embodiment shown in FIGS. 6 and 8-10, the mounting plate and lower bracket interface 262 is oriented perpendicular or substantially perpendicular to the rear wall 264 of the support bar interface 260. In other embodiments, the mounting plate and lower bracket interface 262 is oriented at an angle relative to the rear wall 264 of the support bar interface 260 that is not perpendicular (e.g., fifteen, thirty, forty-five, etc. degrees). As shown in FIGS. 8-10, the mounting plate and lower bracket interface 262 defines one or more apertures, shown as middle bracket apertures 272, and one or more second protrusions, retainers, or tabs (e.g., angled prongs), shown as second prongs 274, that extend outward from a rear edge thereof. As shown in FIG. 10, the second prongs 274 include a first portion, shown as narrow portion 273, extending from the rear edge of the mounting plate and lower bracket interface 262, and a second portion, shown as retainer portion 275, extending from the narrow portion 273 at an upward angle and that is wider than the narrow portion 273.

As shown in FIGS. 8-10, the middle bracket 226 includes a first portion (e.g., a plate, a flange, etc.), shown as upper bracket flange 276, and a second portion (e.g., a plate, a flange, etc.), shown as device mounting plate flange 281, coupled to and extending downward from a rear edge of the upper bracket flange 276. The upper bracket flange 276 defines one or more first apertures, shown as prong apertures 278, proximate the front edge thereof and one or more one or more second apertures, shown as upper bracket apertures 280, proximate the rear edge thereof. As shown in FIGS. 6, 8, and 9, the prong apertures 278 are positioned and shaped to receive and retain the first prongs 270 of the upper bracket 224 to couple the front portions of the upper bracket 224 and the middle bracket 226 together. According to an exemplary embodiment, the first prongs 270 can be received within a wider portion of the prong apertures 278 and slid or translated within the prong apertures 278 to a narrower portion thereof such that the retainer portion 271 of the first prongs 270 prevent the first prongs 270 from disengaging from the prong apertures 278. As shown in FIGS. 6, 8, and 9, with the first prongs 270 received within the prong aperture 278, the upper bracket apertures 280 of the middle bracket 226 align with the middle bracket apertures 272 of the upper bracket 224 and receive one or more fasteners, shown as fasteners 254, to couple the rear portions of the upper bracket 224 and the middle bracket 226 together.

As shown in FIGS. 6 and 8-10, the device mounting plate flange 281 (a) defines one or more first apertures, shown as central apertures 284, positioned along a central, vertical axis of the device mounting plate flange 281 and one or more second apertures, shown as device mounting plate apertures 282, positioned on opposing sides of the central, vertical axis and (b) includes one or more support walls, shown as side supports 286, extending forward from opposing sides of the device mounting plate flange 281. As shown in FIGS. 9 and 10, the side supports 286 includes flanges, shown as support flanges 287, extending inward from upper edges of the side supports 286 and along an underside of the upper bracket flange 276. According to an exemplary embodiment, the support flanges 287 define apertures that (a) are similar to and that align with the upper bracket apertures 280 of the middle bracket 226 and the middle bracket apertures 272 of the upper bracket 224 and (b) receive the fasteners 254.

As shown in FIGS. 8-10, the lower bracket 228 has a transition, shown as bend 288, extending across the width of the lower bracket 228 and defines one or more apertures, shown as support flange apertures 290, positioned proximate a rear edge thereof. The support flange apertures 290 align with the apertures of the support flanges 287, the upper bracket apertures 280 of the middle bracket 226, and the middle bracket apertures 272 of the upper bracket 224 to receive the fasteners 254 to couple the lower bracket 228 to the upper bracket 224 and the middle bracket 226. As shown in FIGS. 6, 8, and 9, the bend 288 provides a stepped profile where a first, front portion of the lower bracket 228 positioned forward of the bend 288 is elevated relative to a second, rear portion of the lower bracket 228 positioned rearward of the bend 288 such that the first, front portion engages with the underside of the upper bracket flange 276 and the second, rear portion engages with the underside of the support flanges 287.

As shown in FIGS. 6 and 8, the device mounting plate 222 engages with and is coupled to the upper bracket 224 and the middle bracket 226. The middle bracket 226 may be coupled to the device mounting plate 222 using one or more fasteners extending through one or more of the device mounting plate apertures 282 or the central apertures 284 of the device mounting plate flange 281. Specifically, as shown in FIG. 6, the device mounting plate apertures 282 of the middle bracket 226 receive one or more fasteners (e.g., screw, bolt, rivet, or another fastening agent), shown as fasteners 252, that extend through the device mounting plate apertures 282 and one of the first middle bracket apertures 236 or the second middle bracket apertures 246 of the device mounting plate 222. The fasteners 252 detachably couple the middle bracket 226 to the device mounting plate 222. In the upper mounting position, the device mounting plate apertures 282 align with the first middle bracket apertures 236. The fasteners 252 extend through the device mounting plate apertures 282 and the first middle bracket apertures 236 and, in some embodiments, partially into the mounting interface 220, when the multi-height device mount 200 is in the upper mounting position. In the lower mounting position, the device mounting plate apertures 282 align with the second middle bracket apertures 246. The fasteners 252 extend through the device mounting plate apertures 282 and the second middle bracket apertures 246 and, in some embodiments, partially into the mounting interface 220, when the multi-height device mount 200 is in the lower mounting position.

In some embodiments, one of the central apertures 284 aligns with the second device aperture 238 or the fourth device aperture 248 of the device mounting plate 222 (e.g., depending on whether the upper bracket 224 and the middle bracket 226 are in the upper mounting position or the lower mounting position). In such embodiments, (a) the central aperture 284 and (b) the second device aperture 238 or the fourth device aperture 248 may both receive the device fastener 250.

As shown in FIGS. 6 and 8, the upper bracket 224 is coupled to the device mounting plate 222 via the second prongs 274 of the lower bracket interface 262. In the upper mounting position, the first upper bracket apertures 232 are configured to receive the second prongs 274 when the multi-height device mount 200. In the lower mounting position, the second upper bracket apertures 242 are configured to receive the second prongs 274. More specifically, one of the first upper bracket apertures 232 or the second upper bracket apertures 242 receives the retainer portion 275 of the second prongs 274 and at least partially receive the narrow portion 273 of the second prongs 274. The narrow portion 273 of the second prongs 274 extends at least partially into one of the first upper bracket apertures 232 or the second upper bracket apertures 242, and the angle of the narrow portion 273 and the shape of the retainer portion 275 enable the retainer portion 275 to maintain the position of the upper bracket 224 with the device mounting plate 222 when the upper bracket 224 is coupled to the middle bracket 226. The second prongs 274 facilitate coupling of the upper bracket 224, the middle bracket 226, and the lower bracket 228 to the device mounting plate 222. The second prongs 274 allow one or more of the device mounting plate apertures 282 or central apertures 284 to align with one or more of the first middle bracket apertures 236, the second device aperture 238, the second middle bracket apertures 246, or the fourth device aperture 248 so the device fasteners 250 and/or the fasteners 252 may couple the middle bracket 226 to the device mounting plate 222.

According to the exemplary embodiment, the multi-height device mount 200 facilitates mounting the display 202 to the front support bar 22 of the vehicle 10. The device mounting plate 222 is configured to secure the display 202 to the multi-height device mount 200 using the device fasteners 250. The one or more prong apertures 278 of the middle bracket 226 receive the first prongs 270 of the upper bracket 224. The retainer portion 271 restricts vertical movement of the upper bracket 224 relative to the middle bracket 226 when the support flange apertures 290, the upper bracket apertures 280, and the middle bracket apertures 272 are aligned. The lower bracket 228 is configured to secure the middle bracket 226 and the upper bracket 224 using the fasteners 254 extending through the support flange apertures 290, the upper bracket apertures 280, and the middle bracket apertures 272. When the upper bracket 224, the middle bracket 226, and the lower bracket 228 are coupled to one another, the second prongs 274 of the middle bracket 226 can be inserted into the second upper bracket apertures 242 to set the multi-height device mount 200 to the lower mounting position (such that the display 202 sits in a higher position) or the first upper bracket apertures 232 to set the multi-height device mount 200 to the upper mounting position (such that the display 202 sits in a lower position). The angle of the second prongs 274 is configured to hold the multi-height device mount 200 in a fixed position so a user may tighten the one or more fasteners 252 to secure the middle bracket 226 to the device mounting plate 222 and to secure the display 202 and the multi-height device mount 200 to the front support bar 22. The multi-height device mount 200 enables the display 202 to be mounted to the front support bar 22 and provides an adjustable mounting solution for the display 202 to be mounted in the vehicle 10 with the canopy 26 configured at various heights.

In some embodiments, the device mounting plate 222 is fixedly coupled to the mounting interface 220 of the display 202 (e.g., with adhesive, welded, ultrasonically welded, etc.) such that the device fasteners 250 are not needed. In some embodiments, the multi-height device mount 200 does not include the device mounting plate 222. Rather, the first upper bracket apertures 232, the second upper bracket apertures 242, the first middle bracket apertures 236, and the second middle bracket apertures 246 are defined by the housing or enclosure of the display 202 along the mounting interface 220.

Message Holder

Figure 11:
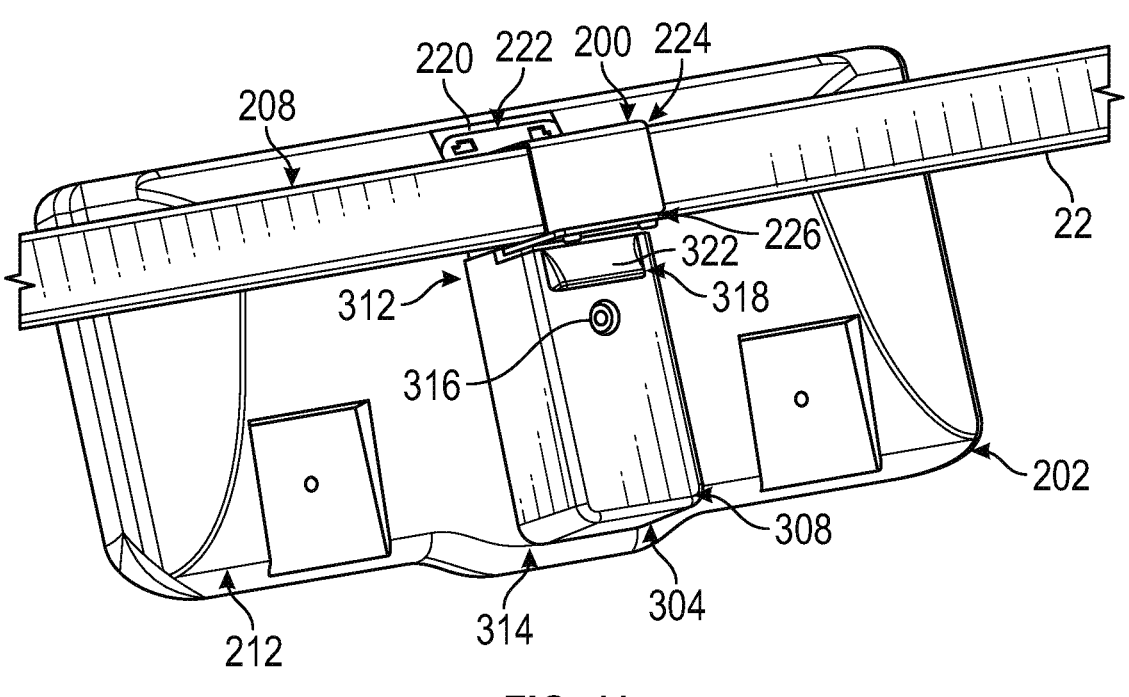
FIG. 11 is a front perspective view of the multi-height device mount of FIG. 3 with an outer housing, according to an exemplary embodiment.
Figure 12:
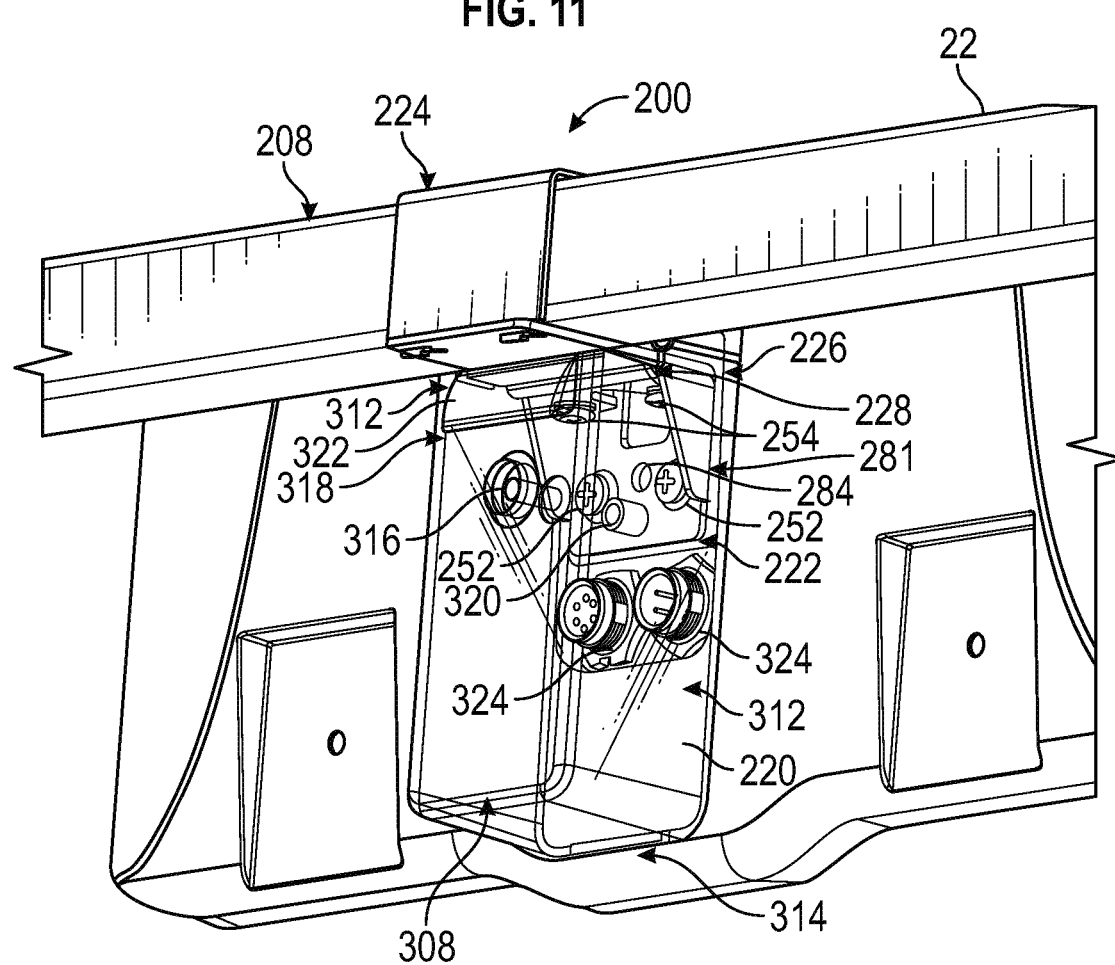
FIG. 12 is another front perspective view of the multi-height device mount of FIG. 11 with the outer housing, according to an exemplary embodiment.
Figure 13:
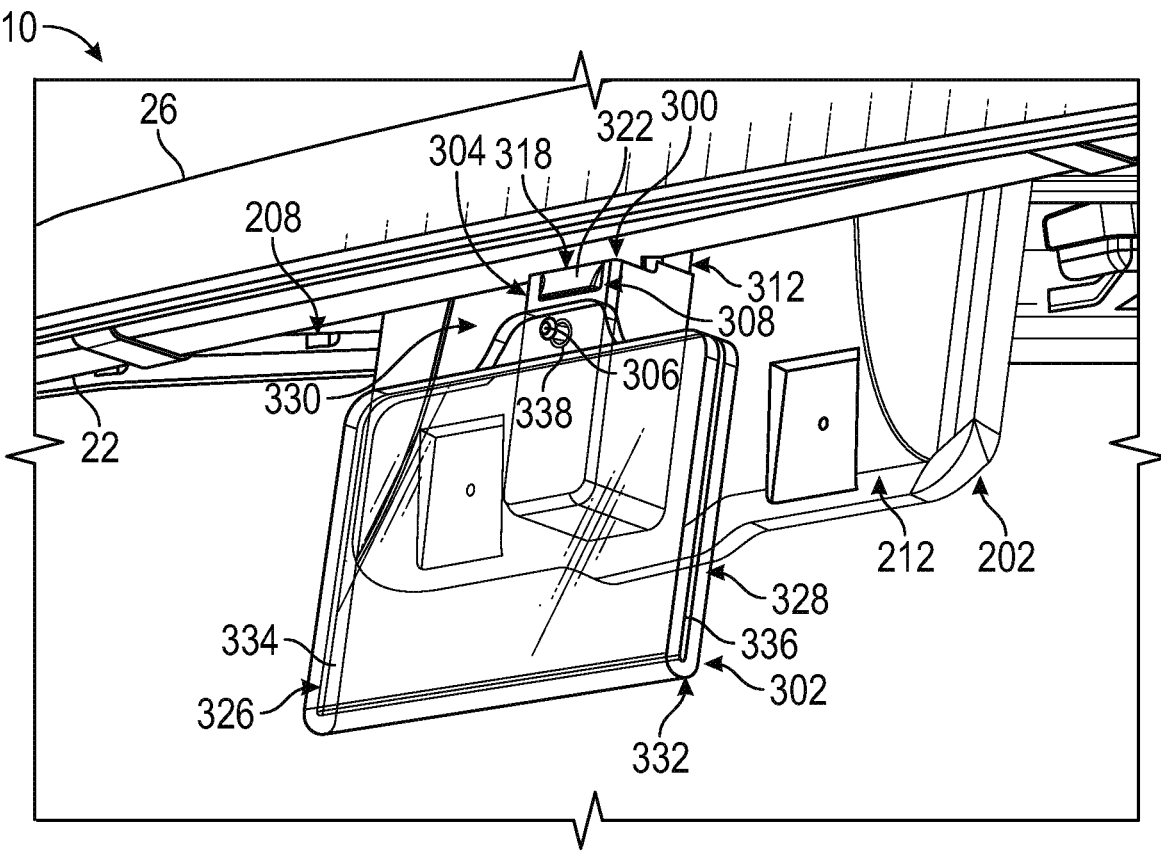
FIG. 13 is another front perspective view of the multi-height device mount of FIG. 11 with a message holder coupled to the outer housing, according to an exemplary embodiment.

Referring generally to FIG. 11-13, the vehicle 10 may include a canopy and one or more support bars (e.g., the front support bar 22) that provide drainage features for water management and may limit the number of locations to install a message holder. Accordingly, the vehicle 10 includes a message holder mounting kit, shown as message holder mounting kit 300, that facilities coupling a holder, shown as message holder 302, to the multi-height device mount 200 mounted to the vehicle 10, rather than to the support bars.

As shown in FIGS. 11-13, the message holder mounting kit 300 includes a housing, case, cap, shroud, or cover, shown as mount housing 304, and one or more fasteners (e.g., screw, bolt, rivet, or another fastening agent), shown as housing fastener 306. In some embodiments, the housing fastener 306 is a longer pan head screw configured to accommodate the thickness of the message holder 302 and grommets, washers, etc., used to secure the message holder 302. As shown in FIGS. 11-13, the message holder mounting kit 300 is positioned along the rear side 212 of the display 202 such that the message holder 302 is visible from the front side of the vehicle 10, and at least partially encloses the multi-height device mount 200 and the mounting interface 220 of the display 202. Accordingly, the message holder mounting kit 300 facilitates mounting the message holder 302 at the front of the vehicle 10, which allows a message within the message holders 302 to be visible. In some embodiments, the message holder mounting kit 300 protects one or more electrical components of the display 202 (e.g., prevents ingress of dust, water, or other undesired items). In some embodiments, the message holder mounting kit 300 includes an anti-rotation feature, which limits movement (i.e., rotation) of the message holder 302 coupled to the message holder mounting kit 300.

As shown in FIGS. 11-13, the mount housing 304 has a first side, shown as front side 308, a first end, shown as top 312, and an opposing, second end, shown as bottom 314, that cooperatively define a chamber or cavity. The front side 308 defines one or more apertures, shown as first message holder aperture 316, and an anti-rotation feature (e.g., protrusion, retainer, extending surface), shown as protrusion 318. The first message holder aperture 316 is sized to receive the housing fastener 306, which facilitates coupling the mount housing 304 to the multi-height device mount 200 and the message holder 302 to the mount housing 304.

As shown in FIGS. 6 and 12, the device mounting plate flange 281 of the middle bracket 226 includes an alignment device (e.g., receiver, protrusion, interface, retainer, etc.), shown as post 320, which aligns with one of the central apertures 284. The housing fastener 306 is configured to extend into the first message holder aperture 316 and the post 320, and in some embodiments, through the second device aperture 238 or the fourth device aperture 248 of the device mounting plate 222 and into the back of the display 202 (e.g., replacing one of the device fasteners 250), to couple the mount housing 304 to the multi-height device mount 200. In some embodiments, the post 320 includes threads that allow the housing fastener 306 to secure the mount housing 304 to the device mounting plate flange 281 of the middle bracket 226. In some embodiments, the first message holder aperture 316 recesses partially into (e.g., towards the rear side 212 of the display 202) the mount housing 304. In such embodiments, the housing fastener 306 is positioned or recessed within the first message holder aperture 316 so the housing fastener 306 does not extend outwardly from the front side 308 of the mount housing 304 (e.g., the housing fastener 306 would not be visible from the left or side of the vehicle 10).

As shown in FIGS. 11-13, the protrusion 318 is positioned towards, proximate, or at the top 312 on the front side 308 of the mount housing 304. The protrusion 318 extends laterally across the front side 308 and includes a rounded, sloped, front surface 322. The protrusion 318 extends outwardly from the mount housing 304 (e.g., away from the rear side 212 of the device), and decreases in thickness towards the top 312 of the mount housing 304 such that the depth of the protrusion 318 is greater towards the bottom 314 of the mount housing 304. The protrusion 318 is positioned above the first message holder aperture 316 such that the protrusion 318 restricts movement of the message holder 302 when a portion of the message holder 302 engages the protrusion 318.

As shown in FIG. 12, the mount housing 304 encloses at least a portion of the mounting interface 220, at least a portion of the device mounting plate 222, and at least a portion of the middle bracket 226. The top 312 of the mount housing 304 engages the middle bracket 226 and the lower bracket 228. In some embodiments, the display 202 includes one or more cable or wiring harness connections, shown as wiring connections 324, which facilitate coupling of the display 202 to one or more wiring assemblies. In some embodiments, the wiring connections 324 are positioned on the mounting interface 220 of the display 202. In such embodiments, the cavity of the mount housing 304 encloses the wiring connections 324 and protects the wiring connections 324 by preventing dust, water, or other harmful materials from engaging the wiring connections 324.

As shown in FIG. 13, the message holder 302 is mounted or coupled to the mount housing 304 using the housing fastener 306. The message holder 302 includes a first side, shown as front side 326, an opposing second side, shown as rear side 328, a first end, shown as top 330, and an opposing, second end, shown as bottom 332. The message holder 302 includes an at least partially transparent structure, shown as holding structure 334, that has (a) a front panel that extends from the top 330 at the front side 326 and continues to the bottom 332, (b) a curved portion at the bottom 332, and a rear panel that extends from the bottom 332, along the rear side 328, and towards the top 330 of the message holder 302. The holding structure 334 defines a cavity or sleeve, shown as insert slot 336, that extends laterally across the message holder 302 between the front panel and the rear panel, and is configured to receive and hold a message. In some embodiments, the insert slot 336 has a "U-shape" and allows for the message to be removed from or inserted on either lateral side or top of the message holder 302. The top 330 of the rear panel of the message holder 302 defines one or more apertures, shown as second message holder aperture 338, configured to align with the first message holder aperture 316 and receive the housing fastener 306, which facilitates coupling the message holder 302 to the mount housing 304. The top 330 of the rear panel of the message holder 302 is shaped to restrict movement of the message holder 302 when the top 330 of the message holder 302 engages the protrusion 318 of the mount housing 304. In some embodiments, the shape of the top 330 of the message holder 302 limits rotational movement of the message holder 302 about an axis defined by the housing fastener 306 (e.g., an axis extending longitudinally through the housing fastener 306).

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, and the suspension system 60, the braking system 70, the sensors 90, the vehicle controller 100, etc.) as shown in the various exemplary embodiments is illustrative only. Additionally, any element disclosed in one embodiment may be incorporated or utilized with any other embodiment disclosed herein.

The invention claimed is:

1. A golf vehicle comprising:
   a chassis;
   a support bar mounted to the chassis;
   a display;
   a display mount coupling the display to the support bar, the display mount including:
      a bracket assembly coupled to the display and the support bar; and
      a housing at least partially covering the bracket assembly, the housing defining a first aperture; and
   a message holder including an at least partially transparent panel, the message holder defining (a) a slot configured to receive a message and (b) a second aperture that aligns with the first aperture of the housing to receive a fastener to couple the message holder to the housing.

2. The golf vehicle of claim 1, wherein the bracket assembly includes a post extending therefrom, wherein the first aperture, the second aperture, and the post are configured to receive the fastener to couple the housing and the message holder to the bracket assembly.

3. The golf vehicle of claim 1, wherein the housing includes a retainer positioned to prevent rotation of the message holder relative to the housing.

4. The golf vehicle of claim 1, wherein the slot is u-shaped such that the message can be inserted therein from a top end, a left side, or a right side of the message holder.

5. The golf vehicle of claim 1, wherein the at least partially transparent panel is a first panel, wherein the message holder includes a second panel coupled to the first panel with the slot defined therebetween, and wherein a top portion of one of the first panel or the second panel defines the second aperture.

6. The golf vehicle of claim 1, wherein the fastener is a first fastener, and wherein the bracket assembly includes:
   a mounting plate coupled to the display, the mounting plate defining an interface and a third aperture;
   a first bracket including a protrusion that engages with the interface to couple the first bracket to the mounting plate; and
   a second bracket coupled to the first bracket such that the first bracket and the second bracket define a support bar passage that receives a portion of the support bar, the second bracket defining a fourth aperture that aligns with the third aperture, the third aperture and the fourth aperture configured to receive a second fastener to couple the second bracket to the mounting plate.

7. The golf vehicle of claim 6, wherein the protrusion includes a plurality of protrusions.

8. The golf vehicle of claim 6, wherein the third aperture includes a plurality of third apertures and the fourth aperture includes a plurality of fourth apertures.

9. The golf vehicle of claim 6, wherein the protrusion includes a narrow portion and a retainer portion that is wider than the narrow portion, and wherein the retainer portion secures the protrusion within the interface.

10. The golf vehicle of claim 6, wherein the display mount an insert positioned within the support bar passage between the support bar and at least one of the first bracket or the second bracket, and wherein the insert is configured to limit movement of the bracket assembly relative to the support bar.

11. The golf vehicle of claim 6, wherein the interface is a first interface, wherein the mounting plate defines a second interface positioned below the first interface and a fifth aperture positioned below the third aperture, and wherein engaging the protrusion of the first bracket with the first interface of the mounting plate and aligning the fourth aperture of the second bracket with the third aperture of the mounting plate facilitates mounting the display to the support bar at a first height, and wherein engaging the protrusion of the first bracket with the second interface of the mounting plate and aligning the fourth aperture of the second bracket with the fifth aperture of the mounting plate facilitates mounting the display to the support bar at a second height different than the first height.

12. A display mount for mounting a display screen to a golf vehicle, the display mount comprising:

a bracket assembly configured to couple the display screen to a support bar of the golf vehicle;

a housing configured to at least partially cover the bracket assembly, the housing defining a first aperture; and a message holder including an at least partially transparent panel, the message holder defining (a) a slot configured to receive a message and (b) a second aperture that aligns with the first aperture of the housing to receive a fastener to couple the message holder to an outward facing surface of the housing.

13. The display mount of claim 12, wherein the bracket assembly includes a post extending therefrom, wherein the first aperture, the second aperture, and the post are configured to receive the fastener to couple the housing and the message holder to the bracket assembly.

14. The display mount of claim 12, wherein the housing includes a retainer positioned to prevent rotation of the message holder relative to the housing.

15. The display mount of claim 12, wherein the slot is u-shaped such that the message can be inserted therein from a top end, a left side, or a right side of the message holder.

16. The display mount of claim 12, wherein the at least partially transparent panel is a first panel, wherein the message holder includes a second panel coupled to the first panel with the slot defined therebetween, and wherein a top portion of one of the first panel or the second panel defines the second aperture.

17. The display mount of claim 12, wherein the fastener is a first fastener, and wherein the bracket assembly includes:

a mounting plate configured to couple to the display screen, the mounting plate defining an interface and a third aperture;

a first bracket including a protrusion that engages with the interface to couple the first bracket to the mounting plate; and a second bracket configured to couple to the first bracket such that the first bracket and the second bracket define a support bar passage that receives a portion of the support bar, the second bracket defining a fourth aperture that aligns with the third aperture, the third aperture and the fourth aperture configured to receive a second fastener to couple the second bracket to the mounting plate.

18. The display mount of claim 17, further comprising an insert configured to positioned within the support bar passage between the support bar and at least one of the first bracket or the second bracket, and wherein the insert is configured to limit movement of the bracket assembly relative to the support bar.

19. A mount for mounting a device to a golf vehicle, the mount comprising:

a bracket assembly configured to couple the device to a support bar of the golf vehicle, the bracket assembly including a post extending therefrom;

a housing configured to at least partially cover the bracket assembly, the housing defining a first aperture; and a message holder including a first panel and a second panel coupled to the first panel with a slot defined therebetween that is configured to receive a message, a top portion of one of the first panel or the second panel defining a second aperture that aligns with the first aperture of the housing and the post of the bracket assembly;

wherein the first aperture, the second aperture, and the post are configured to receive a fastener to couple the message holder and the housing to the bracket assembly; and wherein the housing includes a retainer positioned to prevent rotation of the message holder relative to the housing.

20. The mount of claim 19, wherein the slot is u-shaped such that the message can be inserted therein from a top end, a left side, or a right side of the message holder.

* * * * *